United States Patent
Li et al.

(10) Patent No.: US 9,606,335 B2
(45) Date of Patent: Mar. 28, 2017

(54) EXTREME ULTRAVIOLET LASER MARKING Fθ SHOT AND LASER PROCESSING DEVICE

(71) Applicants: HAN'S LASER TECHNOLOGY CO., LTD., Guangdong (CN); HAN'S CNC SCIENCE AND TECHNOLOGY CO., LTD, Guangdong (CN)

(72) Inventors: Jiaying Li, Shenzhen (CN); Chaoming Zhou, Shenzhen (CN); Yunfeng Gao, Shenzhen (CN)

(73) Assignees: HAN'S LASER TECHNOLOGY INDUSTRY GROUP CO., LTD., Shenzhen (CN); HAN'S CNC SCIENCE AND TECHNOLOGY CO., LTD., Shenzhen (CN)

( * ) Notice: Subject to any disclaimer, the term of this patent is extended or adjusted under 35 U.S.C. 154(b) by 21 days.

(21) Appl. No.: 14/439,747

(22) PCT Filed: Oct. 31, 2012

(86) PCT No.: PCT/CN2012/083801
§ 371 (c)(1),
(2) Date: Apr. 30, 2015

(87) PCT Pub. No.: WO2014/067085
PCT Pub. Date: May 8, 2014

(65) Prior Publication Data
US 2015/0268454 A1    Sep. 24, 2015

(51) Int. Cl.
*G02B 13/14* (2006.01)
*G02B 9/34* (2006.01)
(Continued)

(52) U.S. Cl.
CPC .......... *G02B 13/14* (2013.01); *B23K 26/0066* (2013.01); *B23K 26/0648* (2013.01);
(Continued)

(58) Field of Classification Search
CPC . G02B 9/34; G02B 9/60; G02B 13/14; B23K 26/06; B23K 26/0648
(Continued)

(56) References Cited

U.S. PATENT DOCUMENTS 6,084,723 A * 7/2000 Matsuzawa ............ G02B 13/14
359/754
6,451,462 B1    9/2002 Schuster
(Continued)

FOREIGN PATENT DOCUMENTS

CN    101236291 A    8/2008
CN    101846790 A    9/2010
(Continued)

OTHER PUBLICATIONS

Office Action dated Jul. 4, 2016 from corresponding Japanese Patent Application No. 2015-540007, pp. 1-3.
(Continued)

*Primary Examiner* — Samuel M Heinrich
(74) *Attorney, Agent, or Firm* — Polsinelli PC (57) ABSTRACT

An Fθ lens for extreme ultraviolet laser marking assembly and a laser processing device are provided. The lens assembly includes a first lens (L1), a second lens (L2), a third lens (L3), and a fourth lens (L4) successively coaxially arranged along a transmission direction of an incident laser. The first lens (L1) is a biconcave negative lens; the second lens (L2) is a falcate negative lens; the third lens (L3) is a falcate positive lens; and the fourth lens (L4) is a biconvex positive lens; and an intermediate part of the second lens (L2) and the third lens (L3) are both convex toward a transmission
(Continued)

direction of the laser. A proportion of the refractive index of the first, the second, the third and the fourth lenses to the abbe number is 1.476/68, with a tolerance of 5%. By means of the design of the four lenses and relative positions therebetween, astigmatism and distortion are effectively corrected, and the focusing degree of the energy is high. Imaging and marking of high quality are achieved; imaging quality is improved, and the structure of the lens assembly is simple, which is convenient for designing and appropriate for various laser processing devices.

14 Claims, 5 Drawing Sheets

(51) Int. Cl.
*G02B 9/60* (2006.01)
*B23K 26/064* (2014.01)
*G02B 13/00* (2006.01)
*B23K 26/06* (2014.01)
*B23K 26/00* (2014.01)
*B23K 26/364* (2014.01)

(52) U.S. Cl.
CPC .............. *B23K 26/364* (2015.10); *G02B 9/34* (2013.01); *G02B 9/60* (2013.01); *G02B 13/0005* (2013.01); *G02B 13/143* (2013.01)

(58) Field of Classification Search
USPC ..... 359/355, 357, 432; 347/224; 219/121.75
See application file for complete search history.

(56) References Cited

U.S. PATENT DOCUMENTS

| | | |
|---|---|---|
| 6,597,521 B2 | 7/2003 | Schuster |
| 2003/0012893 A1 | 1/2003 | Schuster |

FOREIGN PATENT DOCUMENTS

| | | |
|---|---|---|
| CN | 102262282 A | 11/2011 |
| DE | 20 2012 003 079 U1 | 3/2012 |
| DE | 202012003080 U1 | 5/2012 |
| JP | 2000-507003 | 6/2000 |

OTHER PUBLICATIONS

Office Action dated Jun. 17, 2016 from corresponding Chinese Patent Application No. 201280076746.X, pp. 1-5.
Shin, Katsurao. The World of Fused Silica, Jul. 20, 2002, Japan, pp. 42 and 67 (with English Translation).
International Search Report dated Aug. 8, 2013.

* cited by examiner

EXTREME ULTRAVIOLET LASER MARKING Fθ SHOT AND LASER PROCESSING DEVICE

CROSS-REFERENCE TO RELATED APPLICATIONS

This application is a National Phase filing under 35 U.S.C. §371 of PCT/CN2012/083801 filed on Oct. 31, 2012, the entire contents of which is hereby incorporated by reference.

FIELD OF THE INVENTION

The present disclosure relates to the field of optical technology, more particularly to an Fθ lens assembly for extreme ultraviolet laser marking.

BACKGROUND OF THE INVENTION

In the laser marking technology, different materials and mediums absorb and interact with lasers of different wavelengths, in other words, for different medium to be processed, laser devices with different wavelengths must be employed. In addition, according to "Rayleigh" rules, the theoretic resolution distance of laser marking is:

d=2.44λ f/D, where:

d represents the minimum resolution distance between two points;

λ represents the wavelength of processing light beam;

f represents the focal length of optical lens assembly;

D represents an entrance pupil diameter of optical lens assembly.

Thus, high resolution dot pitch can be obtained by adopting laser beam with ultra-short wavelength. Currently, the minimum wavelength of commercial laser device λ=266 nm. Theoretically, its resolution is five times as high as that of laser device adopting wavelength of 1064 nm, which is a very attractive choice. Nonetheless, the practical materials which can be penetrated by the ultra-short laser are rare, and fused silica is the only one ideal material, however, the refractive index of the fused silica is highly low. Ratio of refractive index to Abbe number of the fused silica is 1.476/68. If the fused silica is used as material of the lens assembly, on one hand, the thickness of the lens will increase, on the other hand, since the radius of the lens r is normally proportional to refractive index, when the fused silica is used to manufacture lens assembly, the radius r will be relative small, causing the high-order aberrations to increase, thereby making the design of high-quality Fθ lens assembly more difficult.

SUMMARY OF THE INVENTION

Technical Problems

It is an object of the present invention to provide an Fθ lens assembly for extreme ultraviolet laser marking, aiming to overcome the shortcomings of the poor imaging quality and design difficulty of conventional lens assembly for extreme ultraviolet laser marking.

SOLUTIONS TO THE PROBLEMS

Technical Solutions

The technical solutions of the present disclosure are as follows: an Fθ lens assembly for extreme ultraviolet laser marking is provided including a first lens, a second lens, a third lens, and a fourth lens coaxially arranged successively along a transmission direction of an incident laser;

the first lens is a negative biconcave lens; the second lens is a negative meniscus lens; the third lens is a positive meniscus lens; and the fourth lens is a positive biconvex lens;

intermediate parts of the second lens and the third lens protrude towards the transmission direction of the laser;

ratios of refractive index to Abbe number of the first lens, the second lens, the third lens, and the fourth lens to the Abbe number are 1.476/68 respectively, with a tolerance of 5%.

It is another object of the present invention to provide a laser processing device, which includes extreme ultraviolet laser device and optical lens assembly configured to focus extreme ultraviolet laser for marking; the optical lens assembly adopts the Fθ lens assembly for extreme ultraviolet laser marking.

Advantages

By designing the first to fourth lenses with above structure, the astigmatism and distortion are effectively calibrated, and the lens assembly has a high energy concentration, and high quality imaging and high precision marking are achieved, thus the aberration problems difficult for conventional extreme ultraviolet lens assembly to overcome is solved, and the imaging quality is effectively improved. In addition, the lens assembly has a simple structure and is easy to design, which can be widely applied to a variety of laser processing devices. Therefore, a laser marking device adopting the lens assembly can also performs a high quality and high precision marking.

DETAILED DESCRIPTION OF THE EMBODIMENTS

Specific Embodiments of the Invention

These and other features of the present invention will become readily apparent upon further review of the following specification and drawings. The various embodiments of the invention may, however, be embodied in many different forms and should not be construed as limited to the embodiments set forth herein.

Figure 1:
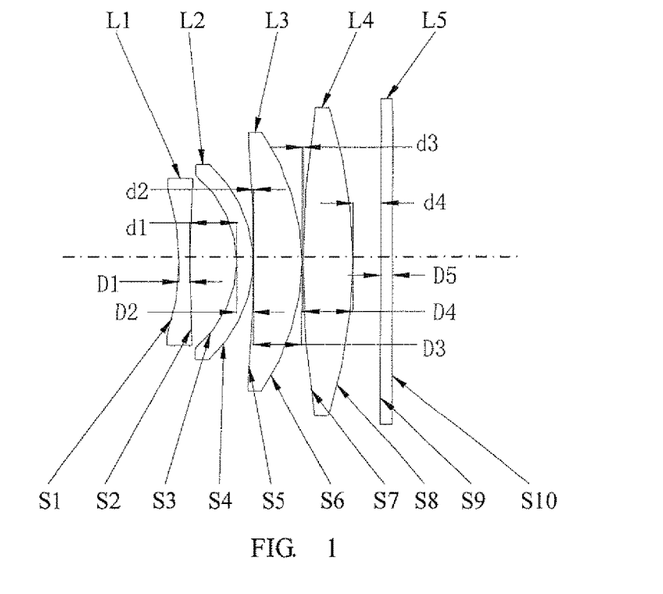
FIG. 1 is a schematic view of an Fθ lens assembly for extreme ultraviolet laser marking according to an embodiment of the present disclosure.

The specific implementations of the invention taken in conjunction with the following specific embodiments are described in more detail:

FIG. 1 is a schematic view of an Fθ lens assembly for extreme ultraviolet laser marking provided by an embodiment of the present disclosure. For clarity, only the parts relevant to the embodiment are shown.

The Fθ lens assembly for extreme ultraviolet laser marking mainly includes a first lens L1, a second lens L2, a third lens L3, and a fourth lens L4 coaxially arranged successively along a transmission direction of an incident laser. The first lens L1 is a negative biconcave lens; the second lens L2 is a negative meniscus lens; the third lens L3 is a positive meniscus lens; and the fourth lens L4 is a positive biconvex lens. The radius of curvature of the second lens L2 is less than that of the emergent surface, and the radius of curvature of an incident surface of the third lens L3 is greater than that of the emergent surface. Intermediate parts of the second lens L2 and the third lens L3 protrude towards the transmission direction of the laser, i.e. convex towards the image space. Opposite surfaces of the first lens L1 are concave inwardly and opposite surfaces of the fourth lens L4 are convex outwardly. In addition, the first lens L1, the second lens L2, the third lens L3, and the fourth lens L4 are made of the same material which has a ratio of refractive index to Abbe number of 1.476/68, with a tolerance of 5%. Specifically, the material is fused silica.

Furthermore, the surface curvature, thickness and other parameters of each lens are optimally designed in the embodiment. Specifically, the first lens L1 includes a first surface S1 and a second surface S2, the radiuses of curvature of which being respectively −50 mm, 300 mm; the second lens L2 includes a third surface S3 and a fourth surface S4, the radiuses of curvature of which being respectively −28 mm, −32 mm; the third lens L3 includes a fifth surface S5 and a sixth surface S6, the radiuses of curvature of which being respectively −250 mm, −50 mm; the fourth lens L4 includes a seventh surface S7 and an eighth surface S8, the radiuses of curvature of which being respectively 250 mm, −100 mm; The minus indicates that a spherical center of the curved surface is located at the object side of the curved surface, numeral value without plus or minus represents a plus, the plus indicates that a spherical center of the curved surface is located at the image side of the curved surface. The first to eighth surfaces are arranged successively along the transmission direction of the laser, and the radiuses of curvature of each surface are not unique, with a tolerance of 5%.

Furthermore, the center thicknesses D and distances d between surfaces of the first to fourth lenses are specially designed in the embodiment. Specifically, the center thicknesses of the first to fourth lenses D1, D2, D3, and D4 are 2 mm, 5 mm, 8 mm, and 8 mm, respectively, with a tolerance of 5%. A distances between the second surface S2 of the first lens L1 and the third surface S3 of the second lens L2, d1, is 9 mm; a distance between the fourth surface S4 of the second lens L2 and the fifth surface S5 of the third lens L3, d2, is 0.5 mm; a distance between the sixth surface S6 of the third lens L3 and the seventh surface S7 of the fourth lens L4, d3, is 0.5 mm; the above mentioned distances between each surface have a tolerance of 5% respectively.

By designing the lens with above curvatures of surfaces R, center thicknesses of the lenses D and the distances between surfaces d, a better imaging quality and a better marking precision can be obtained. In addition, the embodiment further provides a fifth lens L5 located on the light emergent side of the fourth lens L4. The fifth lens is preferably a planar lens including a ninth surface S9 and a tenth surface S10, of course, the radiuses of curvature of which being both ∞. The fifth lens L5 is mainly configured to protect other imaging lenses inside the lens assembly so as to protect them from the influences of dust, moisture, high or low temperature and so on.

Specifically, the fifth lens L5 can be made of the same material as that of the other lenses, with a center thickness D5 of 2 mm and a tolerance of 5%; and a distance between the ninth surface S9 of the fifth lens L5 and the eighth surface S8 of the fourth lens L4 along the optical axis can be 5 mm with a tolerance of 5%.

According to the above contents, the following specific structure of the Fθ lens assembly for extreme ultraviolet laser marking is provided as shown in table 1:

Table 1. structural parameters of Fθ lens assembly for extreme ultraviolet laser marking

TABLE 1

| L(lens) | S (surface) | R (radius of curvature) | d (distance between surfaces) | D (center thickness) | Nd/Vd (material) |
|---|---|---|---|---|---|
| 1 | 1 | −50 | | 2 | 1.476/68 |
|   | 2 | 300 | 9 | | |
| 2 | 3 | −28 | | 5 | 1.476/68 |
|   | 4 | −32 | 0.5 | | |
| 3 | 5 | −250 | | 8 | 1.476/68 |
|   | 6 | −50 | 0.5 | | |
| 4 | 7 | 250 | | 8 | 1.476/68 |
|   | 8 | −100 | 5 | | |
| 5 | 9 | ∞ | | 2 | 1.476/68 |
|   | 10 | ∞ | | | |

The Fθ lens assembly for extreme ultraviolet laser marking is also made of fused silica, and exhibits the following optical properties:

clear wavelength λ=266 nm;

the focal length f=100 mm;

the entrance pupil diameter $D_{ent}$=10 mm;

the marking range A=50*50 $mm^2$;

the field angle 2ω=50°.

By designing the lens on the mentioned parameters such as shape, relative location and structure, the astigmatism and distortion are effectively calibrated, which decreases high-order aberrations, and energy concentration of the focus point is improved, thereby improving masking precision. The biggest clear aperture of the lens assembly is just 62 mm, which is a miniaturized lens assembly and applicable for conventional marking machine, of which the imaging quality can reach an ideal state.

FIGS. 2 through 7 indicate the imaging quality of the Fθ lens assembly for extreme ultraviolet laser masking from different aspects respectively.

Figure 2:
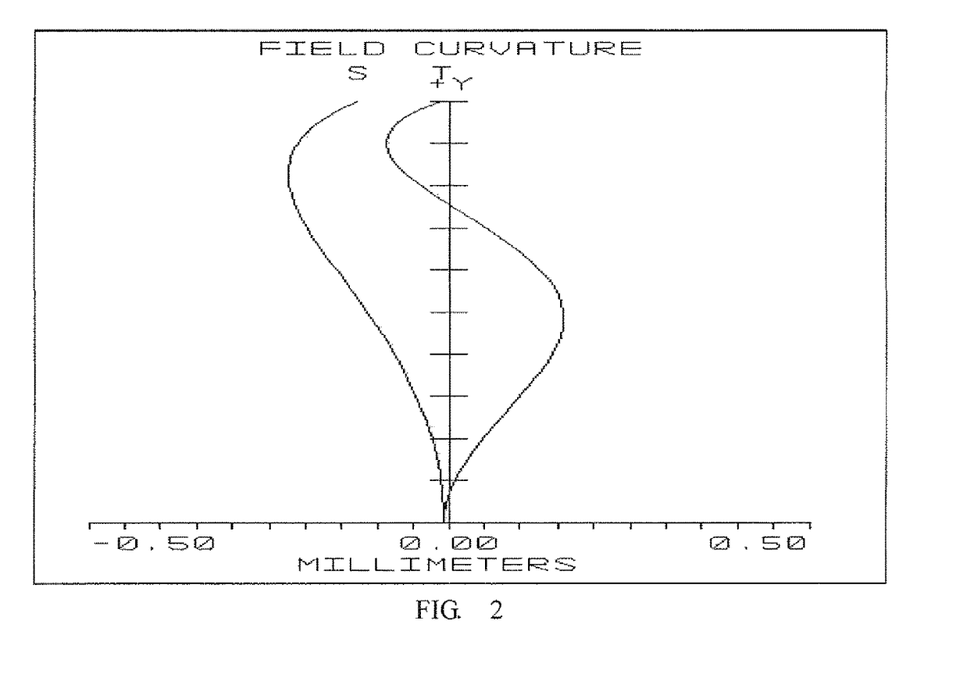
FIG. 2 is a graph illustrating a geometrical aberration of an Fθ lens assembly for extreme ultraviolet laser marking according to an embodiment of the present disclosure.
Figure 3:
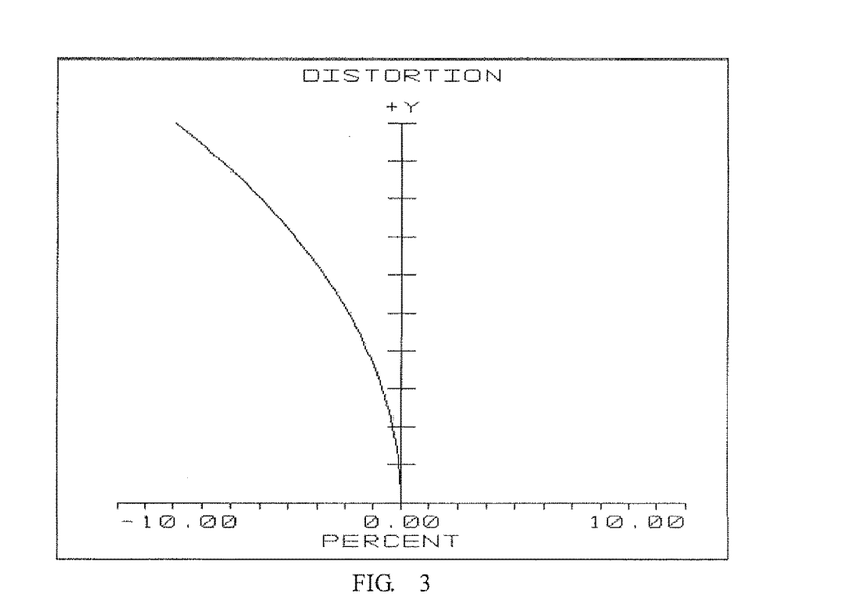
FIG. 3 is a graph illustrating distortion of an Fθ lens assembly for extreme ultraviolet laser marking according to an embodiment of the present disclosure.

FIGS. 2 and 3 indicate the geometrical aberration and distortion of the Fθ lens assembly for extreme ultraviolet laser masking, respectively. The aberration of the seventh stage is compensated by the aberration of the fifth stage in FIG. 2, thereby calibrating the aberration to enable the image plane to be flat, and further causing image plane across the masking range to be flat. As shown in FIG. 3, the lens assembly distortion is effectively calibrated, and there is no clear difference between the axial imaging point and extra-axial imaging point. Thus the astigmatism and distortion of the lens assembly has achieved the state of ideal calibration.

Figure 4:
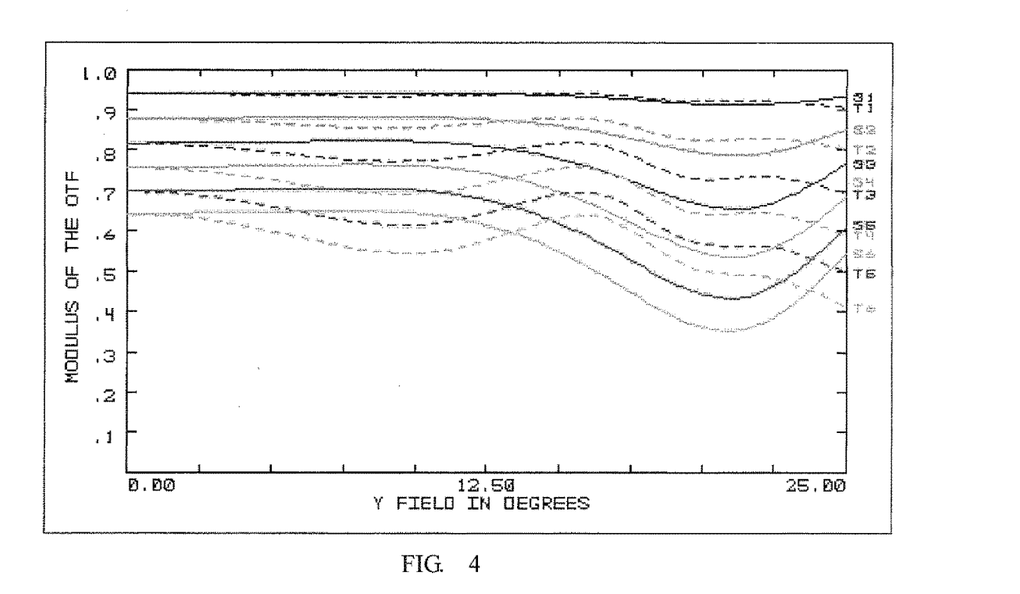
FIG. 4 is a graph of optical transfer function O.T.F of an Fθ lens assembly for extreme ultraviolet laser marking according to an embodiment of the present disclosure.
Figure 5:
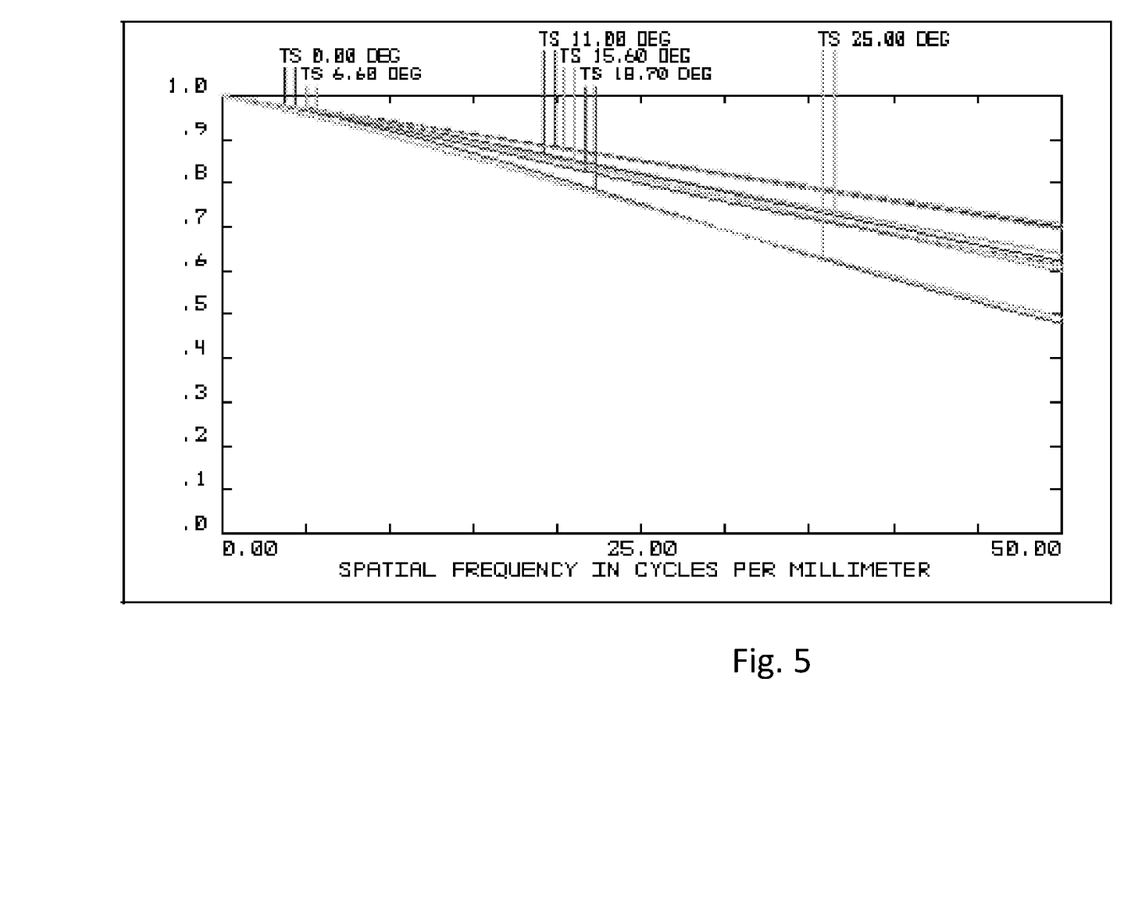
FIG. 5 is a graph illustrating a modulation transfer function M.T.F of an Fθ lens assembly for extreme ultraviolet laser marking according to an embodiment of the present disclosure.

FIGS. 4 and 5 indicate the optical transfer function O.T.F and modulation transfer function M.T.F of the lens assembly, respectively. Optical transfer function O.T.F represents the transfer function of fixed resolution, and the vertical axis represents percentage; lateral axis represents the field. The curves represent the optical transfer functions of which the resolutions equal to 10 lp/mm (10 line pairs), 20 lp/mm (20 line pairs), 30 lp/mm (30 line pairs), and 40 lp//mm (40 line pairs) respectively. In the M.T.F curves of FIG. 5, the vertical axis represents percentage, and the lateral axis represents the number of line pairs. Both O.T.F and M.T.F are configured to evaluate the imaging quality of the lens assembly. As shown in FIGS. 4 and 5, there is no clear difference between the axial point and extra-axial point of the lens assembly; the imaging result is stable, thereby achieving a flat field.

Figure 6:
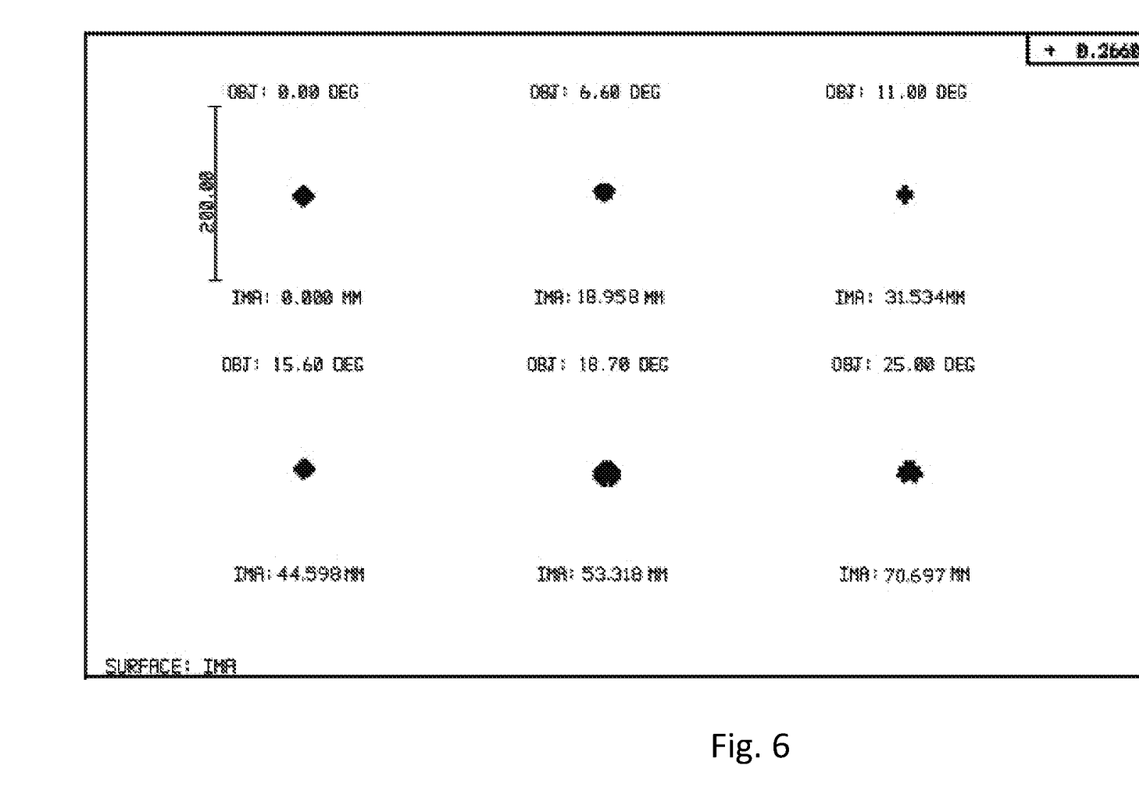
FIG. 6 is a diagram of defocused spots of an Fθ lens assembly for extreme ultraviolet laser marking according to an embodiment of the present disclosure.
Figure 7:
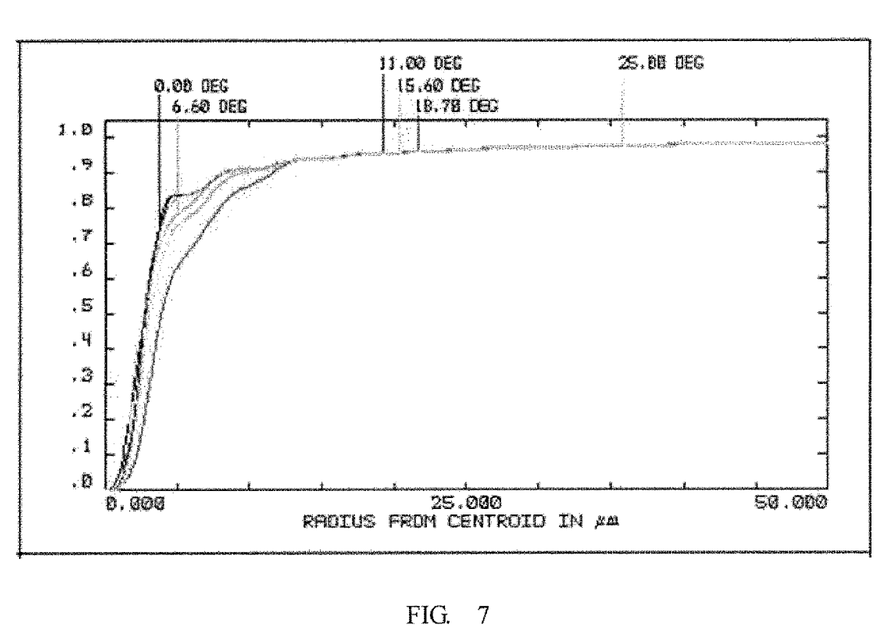
FIG. 7 is a diagram of the energy concentration of an Fθ lens assembly for extreme ultraviolet laser marking according to an embodiment of the present disclosure.

FIGS. 6 and 7 represent defocused spots and energy concentration of the lens assembly respectively. FIG. 6 indicates the sizes of the defocused spots in six fields. As shown in the figure, the sizes of the defocused spots in all the fields are kept smaller than 10 μm, and 80 % of the energy is concentrated within the range of 10 μm. The energy concentration is extremely high, thereby allowing a high-precision masking.

The Fθ lens for extreme ultraviolet laser masking assembly provided by the present disclosure can effectively calibrate astigmatism and distortion and achieve high energy concentration without changing the material of lens assembly, achieving high quality imaging and high precision masking, solving the aberration problem which is difficult for conventional extreme ultraviolet lens assembly to overcome, and improving imaging quality effectively; in addition, the lens is simple in structure and easy to design, which is widely applicable to a variety of laser processing devices.

The present disclosure further provides a laser processing device including an extreme ultraviolet laser device and an optical lens assembly configured to focus extreme ultraviolet laser for marking, and the optical lens assembly can be the Fθ lens assembly for extreme ultraviolet laser marking provided by the present disclosure so as to achieve high quality and high precision masking. The lens assembly is especially suitable for extreme ultraviolet laser masking, more particularly suitable for laser with a wavelength of 266 nm; thus preferably, the extreme ultraviolet laser device has an emission wavelength of 266 nm.

Only the preferred embodiments are disclosed in the above description, which are not intended to limit the invention. Rather, various modifications, replacements, and improvements can be made within the objective and principle of the invention without departing from the protection scope of the invention.

What is claimed is:

1. An Fθ lens assembly for extreme ultraviolet laser marking, comprising a first lens, a second lens, a third lens, and a fourth lens, which are coaxially arranged successively along a transmission direction of an incident laser;
   wherein the first lens is a negative biconcave lens; the second lens is a negative meniscus lens; the third lens is a positive meniscus lens; and the fourth lens is a positive biconvex lens;
   intermediate parts of the second lens and the third lens protrude towards the transmission direction of the laser;
   ratios of refractive index to Abbe number of the first lens, the second lens, the third lens, and the fourth lens are 1.476/68, respectively, with a tolerance of 5%.

2. The Fθ lens assembly for extreme ultraviolet laser marking according to claim 1, wherein the first lens, the second lens, the third lens, and the fourth lens are made of fused silica.

3. The Fθ lens assembly for extreme ultraviolet laser marking according to claim 1, wherein the first lens comprises a first surface and a second surface; the second lens comprises a third surface and a fourth surface; the third lens comprises a fifth surface and a sixth surface; the fourth lens comprises a seventh surface and an eighth surface; the first to eighth surfaces are arranged successively along the transmission direction of the laser;
   radiuses of curvature of the first to eighth surfaces are −50 mm, 300 mm, −28 mm, −32 mm, −250 mm, −50 mm, 250 mm, −100 mm, respectively, with a tolerance of 5%.

4. The Fθ lens assembly for extreme ultraviolet laser marking according to claim 3, wherein center thicknesses of the first to fourth lenses are 2 mm, 5 mm, 8 mm, and 8 mm, respectively;
   a distance between the second surface and the third surface along the optical axis is 9 mm;
   a distance between the fourth surface and the fifth surface along the optical axis is 0.5 mm;
   a distance between the e sixth surface and the seventh surface along the optical axis is 0.5 mm;
   each of the center thicknesses and each of the distances have a tolerance of 5%.

5. The Fθ lens assembly for extreme ultraviolet laser marking according to claim 1, further comprising a fifth lens located on a light emergent side of the fourth lens, wherein the fifth lens comprises a ninth surface and a tenth surface; radiuses of curvature of the ninth surface and the tenth surface are both ∞.

6. The Fθ lens assembly for extreme ultraviolet laser marking according to claim 5, wherein a ratio of refractive index to Abbe number of the fifth lens is 1,476/68, with a tolerance of 5%.

7. The Fθ lens assembly for extreme ultraviolet laser marking according to claim 6, wherein the fifth lens is made of fused silica.

8. The Fθ lens assembly for extreme ultraviolet laser marking according to claim 6, wherein the center thickness of the fifth lens is 2 mm with a tolerance of 5%;
   a distance between the ninth surface and eighth surface along the optical axis is 5 mm, with a tolerance of 5%.

9. A laser processing device, comprising an extreme ultraviolet laser device and an optical lens assembly configured to focus extreme ultraviolet laser for marking, wherein the optical lens assembly is the Fθ lens assembly for extreme ultraviolet laser marking according to claim 1.

10. The laser processing device according to claim 9, wherein the extreme ultraviolet laser has an emission wavelength of 266 nm.

11. The Fθ lens assembly for extreme ultraviolet laser marking according to claim 2, further comprising a fifth lens located on a light emergent side of the fourth lens, wherein the fifth lens comprises a ninth surface and a tenth surface; radiuses of curvature of the ninth surface and the tenth surface are both ∞.

12. The Fθ lens assembly for extreme ultraviolet laser marking according to claim 3, further comprising a fifth lens located on a light emergent side of the fourth lens, wherein the fifth lens comprises a ninth surface and a tenth surface; radiuses of curvature of the ninth and the tenth surface are both ∞.

13. The Fθ lens assembly for extreme ultraviolet laser marking according to claim 4, further comprising a fifth lens located on a tight emergent side of the fourth lens, wherein the fifth lens comprises a ninth surface and a tenth surface; radiuses of curvature of the ninth surface and the tenth surface are both ∞.

14. The Fθ lens assembly for extreme ultraviolet laser marking according to claim 7, wherein the center thickness of the fifth lens is 2 mm with a tolerance of 5%;
    a distance between the ninth surface and the eighth surface along the optical axis is 5 mm, with a tolerance of 5%.

\* \* \* \* \*